Feb. 22, 1966                D. W. DRYG ETAL                3,236,378
                    APPARATUS AND METHOD FOR SEGREGATING ARTICLES
Filed April 26, 1962                                    4 Sheets-Sheet 1
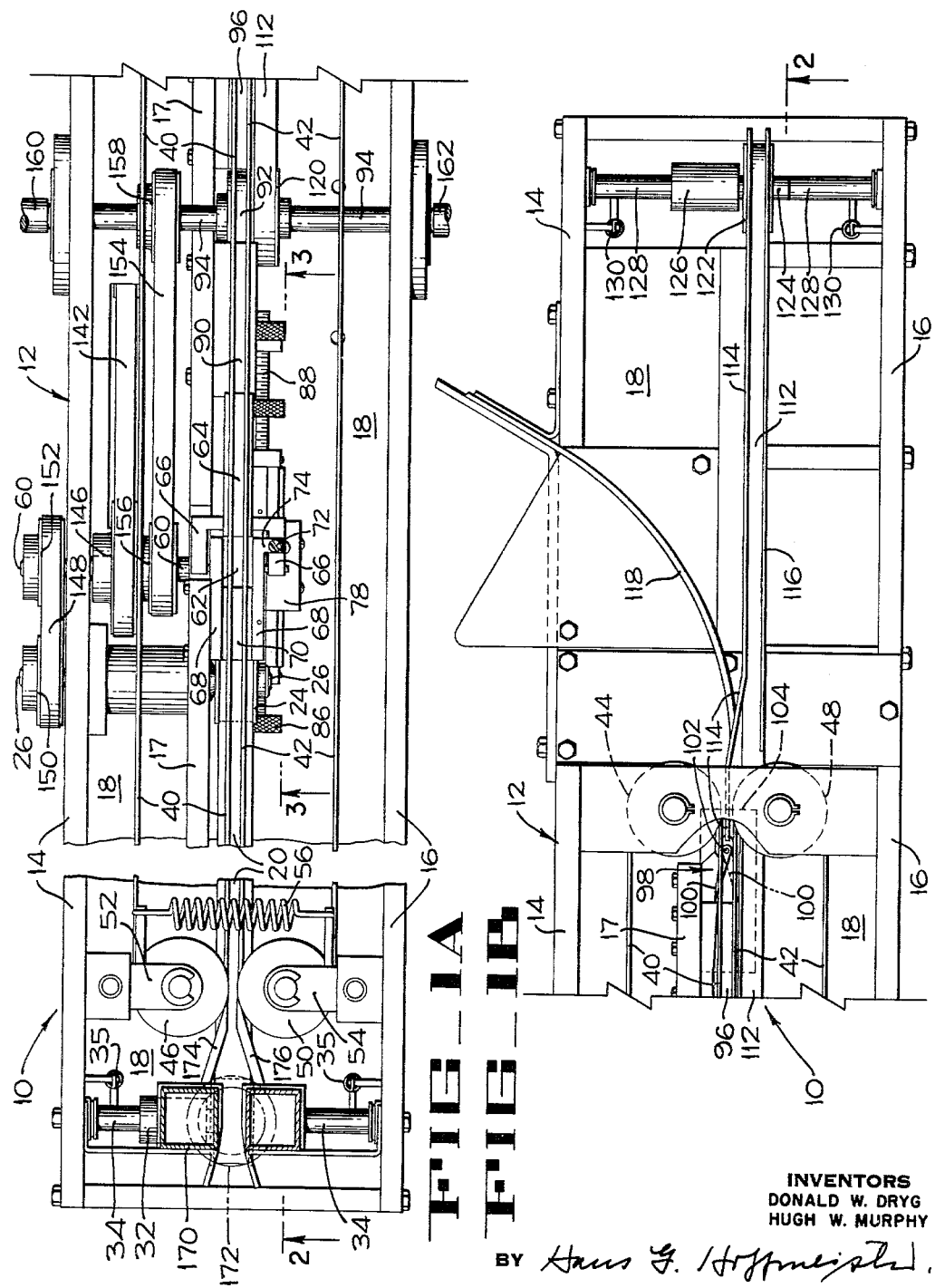
INVENTORS
DONALD W. DRYG
HUGH W. MURPHY
BY Hans G. Hoffmeister
ATTORNEY

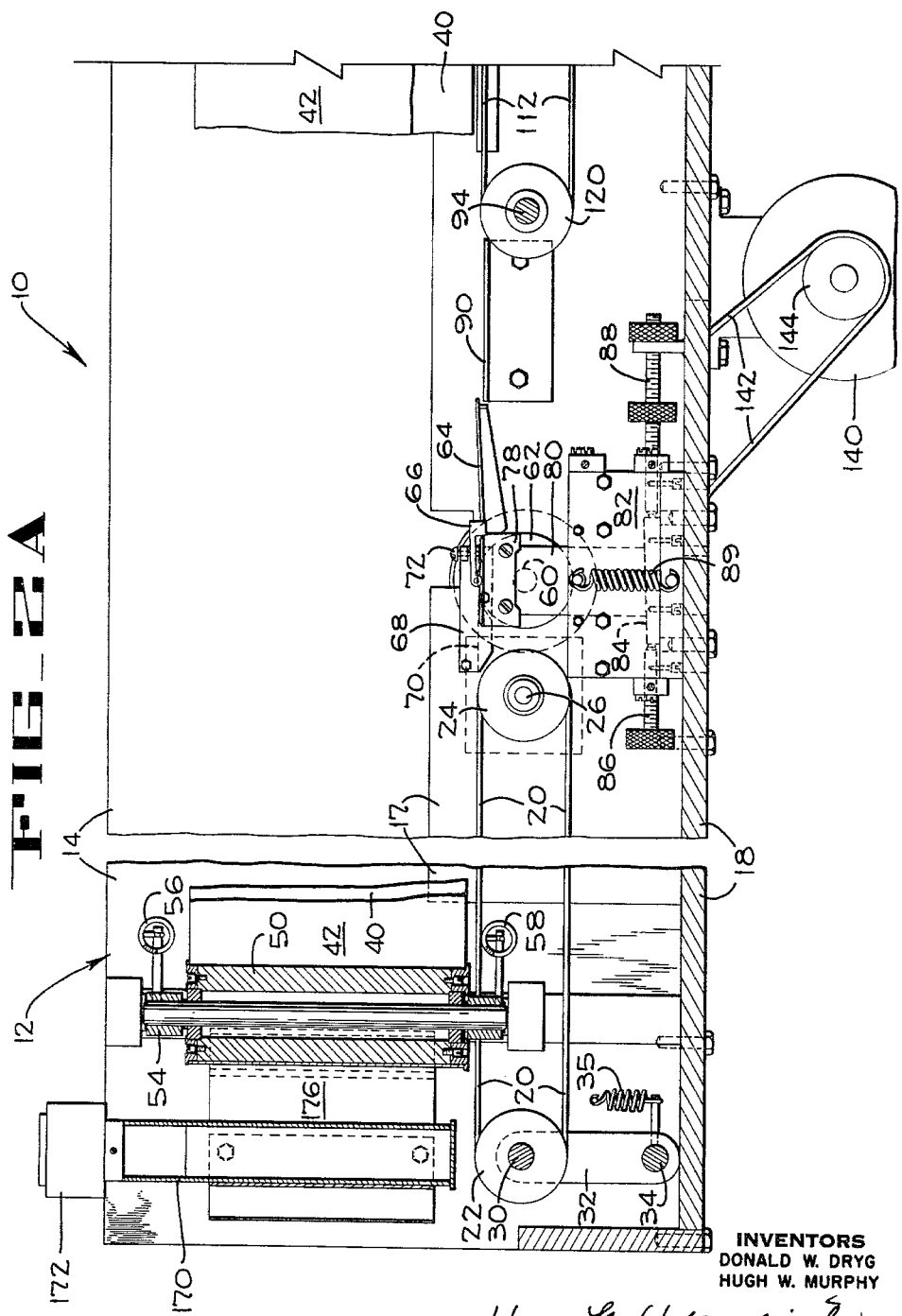

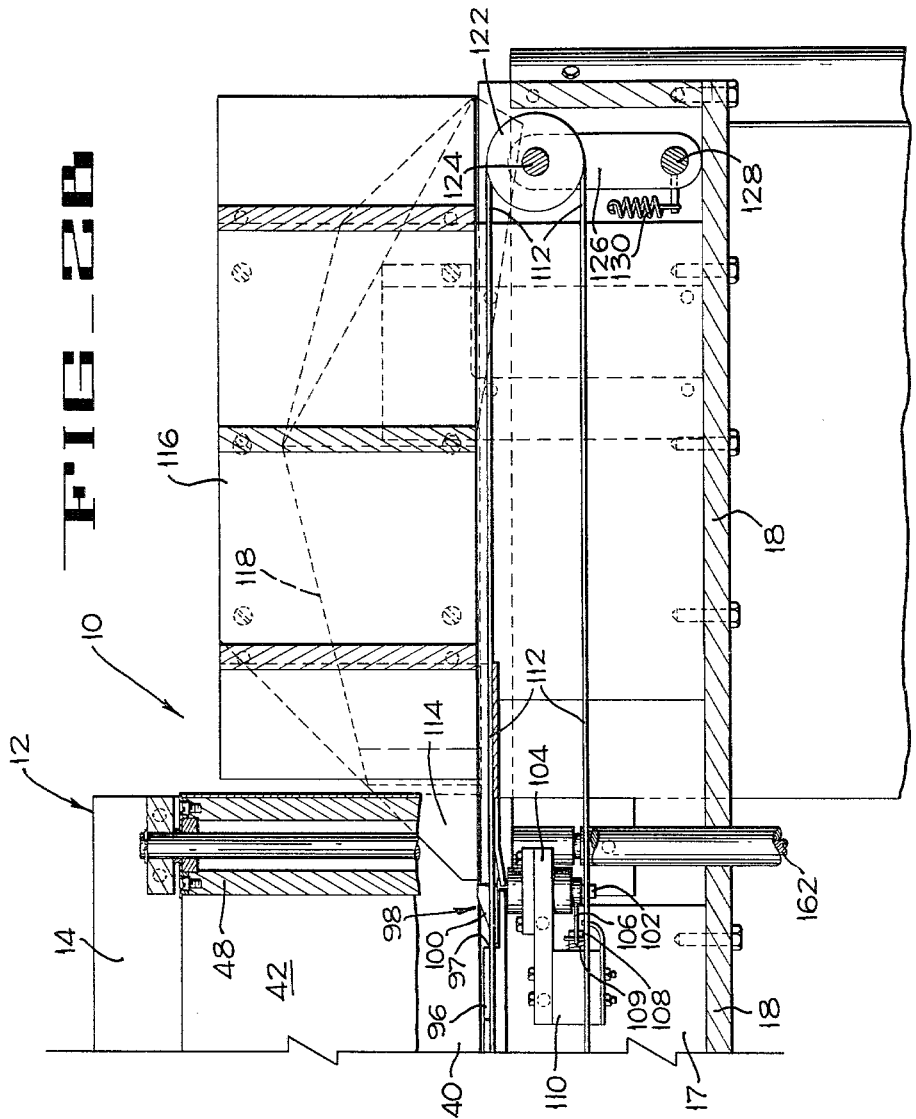

Feb. 22, 1966  D. W. DRYG ETAL  3,236,378
APPARATUS AND METHOD FOR SEGREGATING ARTICLES
Filed April 26, 1962  4 Sheets-Sheet 4
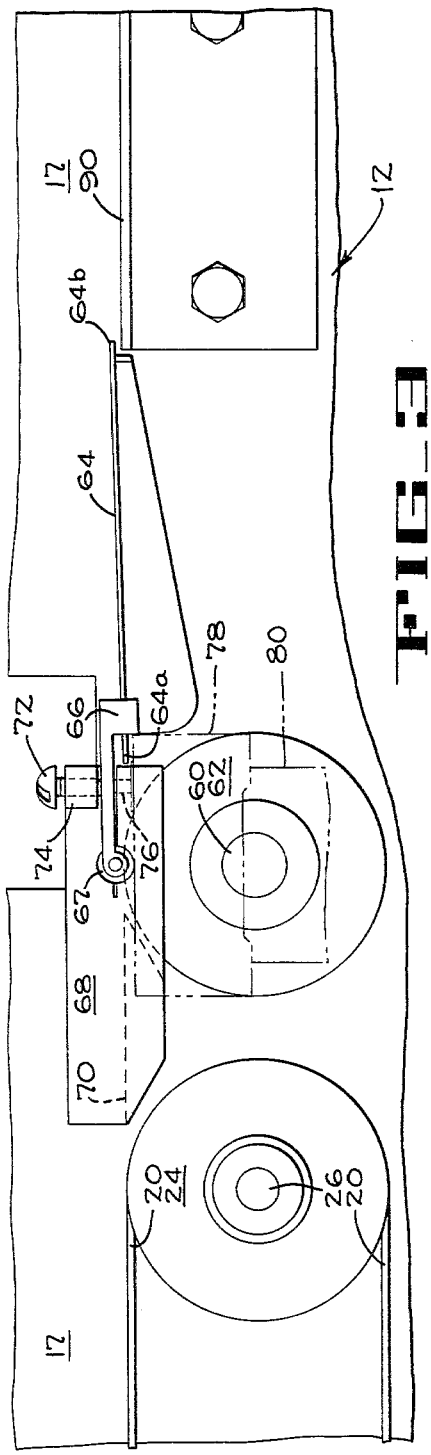
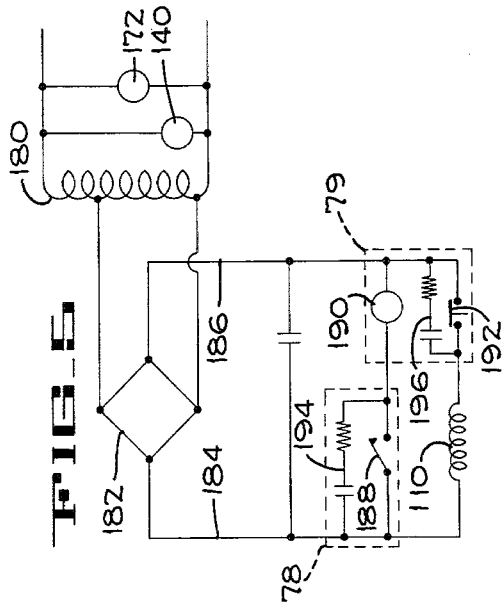
INVENTORS
DONALD W. DRYG
HUGH W. MURPHY
BY
ATTORNEY United States Patent Office 3,236,378
Patented Feb. 22, 1966

3,236,378
APPARATUS AND METHOD FOR SEGREGATING ARTICLES
Donald W. Dryg, Los Gatos, and Hugh W. Murphy, Saratoga, Calif., assignors to FMC Corporation, San Jose, Calif., a corporation of Delaware
Filed Apr. 26, 1962, Ser. No. 190,422
21 Claims. (Cl. 209—121)

The present invention pertains to an apparatus and a method for segregating articles and more particularly to an apparatus and a method for weighing within close tolerances continuously and rapidly moving lightweight, sheet-like articles, such as letters, and for directing the articles into first or second channels depending on their weight.

In the handling of mail it has become iincreasingly necessary to provide automatic mechanisms for handling the high volume of mail processed daily in the metropolitan areas. Accordingly, the subject apparatus is especially suited for weighing and sorting out overweight letters. In regard to the problem of overweight letters, the Post Office Department has determined statistically that approximately 3% of the letters mailed are overweight. If these letters are permitted to pass undetected, a considerable loss of revenue is involved when the total volume of letters handled is considered.

Having in mind the need for an automatic overweight detection apparatus, the Post Office Department has set the permissable tolerance for detection of overweight letters by automatic equipment at 10%. Thus, acceptable automatic weighing mechanism must be able to distinguish a letter weighing 1.100 ounces from one weighing 1.000 ounce.

In addition to making minute distinctions in weight, there are other problems in weighing and sorting letters. For example, letters moving at high speeds along conveyors are subject to aerodynamic forces which tend to deflect the same either upwardly or downwardly, particularly, if the corners of the envelopes are bent which is frequently the case. As such a letter passes over a scale pan, the aerodynamic forces acting thereon may cause a false reading of either too light or too heavy to be effected by the scale mechanism.

Additionally, letters traveling along conveyors between side belts or plates build up an electrostatic charge which causes the letter to cling to the side plate or belt so that the full weight of the letter is not applied to the scale pan.

Although the subject method and apparatus are conveniently described as they are used on letters, it will be understood as the description proceeds that the principles of the invention are applicable to other articles where similar problems are involvetd. As the term "letter" is used herein, however, it means an envelope with or without its contents, or a post card.

Accordingly, it is an object of the present invention to provide an apparatus and a method for accurately segregating light weight articles, such as letters, while they are moving.

Another object is to minimize error while weighing moving light weight articles by eliminating or reducing the effect of aerodynamic forces, electrostatic charges, and friction on the weight of the articles.

Another object is to provide an article segregating apparatus which facilitates the entry of segregated articles into predetermined channels without jamming at the entry to said channels.

These and other objects and advantages of the invention will be apparent from the following detailed description taken in conjunction with the accompanying drawings in which:

FIG. 1A and 1B taken together are a plan of segregating apparatus embodying the present invention, with certain parts broken away to reveal details of elements thereibeneath.

FIGS. 2A and 2B together form a longitudinal vertical section taken generally on lines 2—2 of FIGS. 1A and 1B.

FIG. 3 is an enlarged fragmentary side elevation, as seen from a position indicated by line 3—3 in FIG. 1A, showing the mounting of the scale pan, and showing the microswitch associated therewith in phantom lines.

FIG. 4 is a schematic elevation illustrating the relationship between the gate, the side belts and a letter being conveyed.

FIG. 5 is a schematic wiring diagram for the machine.

The subject segregating apparatus 10 comprises a frame 12 having two side plates 14 and 16, a vertical center plate 17 and a bottom plate 18. An input conveyor belt 20 is trained around two pulleys 22 and 24. The pulley 24 is mounted on a shaft 26 rotatably carried by the side plate 14 and the center plate 17. The pulley 22 is an idler pulley rotatably mounted on a shaft 30 carried by a swinging bracket 32 (FIG. 2A). The bracket is pivotally mounted on a shaft 34 which extends between the side plates 14 and 16 and two springs 35 (FIG. 1A) hold the brackets in position to apply tension to the belt 20.

The belt 20 receives letters resting on one of their longitudinal edges and delivers them between two vertical metal side belts 40 and 42. The flow of letters is from left to right of the machine as illustrated in the drawings.

The belt 40 is trained around a drive pulley 44 and an idler pulley 46. Similarly, the belt 42 is trained around a drive pulley 48 and an idler pulley 50. In the disclosed embodiment, the adjacent reaches, or inner runs, of the belts 40 and 42 form movable side walls which are spaced from each other approximately one half inch and are centered over the middle of the belt 20. The pulleys 44, 46, 48 and 50 are also made of metal and are electrically grounded through the frame 12 of the machine so that any static electric charges which have built up on the letters are conducted through the metal side belts and pulleys to ground. The idler pulleys 46 and 50 are mounted on upper and lower arms of swinging brackets 52 and 54, and springs 56 and 58 interconnect the brackets to maintain tension on the belts 40 and 42.

Just forward of the forward end of the upper reach of the conveyor belt 20, a shaft 60 is rotatably mounted between the side plate 14 and the center plate 17. A roller 62 is mounted on the shaft 60 in alignment with the conveyor belt 20 to receive letters therefrom and give them sufficient forward velocity to slide over a scale pan or weighing platform 64 which is immediately in front of the roller 62.

The scale pan 64 is mounted on and normally projects forwardly and upwardly from the cross piece of a U-shaped yoke 66 which is pivotally mounted at the ends of its side portions by bearings 67 carried by the opposite side walls of a U-shaped bracket 68 (FIG. 3). The pan has a rear edge 64a which is substantially coplanar with the upper run of conveyor belt 20 and with a plane tangential to the roller 62. The bracket 68 has a bottom web 70 which longitudinally bridges the gap between the pulley 24 for the conveyor belt 20 and the roller 62. An adjustable set screw 72 is screwed into a hole provided in a laterally projecting flange 74 on one side wall of the bracket 68 and abuts the upper surface of the yoke 66 to limit upward movement of the scale pan 64. The lower surface of the yoke 66 rests on the button 76 of a normally open microswitch assembly 78 (FIGS. 3 and 5).

The microswitch 78 (FIG. 2A) is fastened to the upper end of a post 80 which is vertically slidable within a guide assembly 82 and which rests on a horizontally slidable wedge 84. Two thumb screws 86 and 88 are screwed into the guide assembly 82 and contact the opposite ends of the wedge 84. A spring 89 urges the post 80 downward against the wedge 84. The vertical position of the microswitch can thus be adjusted by proper manipulation of the thumb screws 86 and 88.

The downward movement of the scale pan 64 to effect closing of the microswitch 78 is the result of two factors, namely, the weight of the letter and the length of time which the letter is on the scale pan. Thus it can be seen that if a first letter has high coefficient of friction with the surface of the scale pan 64, the letter will be retarded and thus remain on the scale pan for a longer period of time than a second letter which has a lower coefficient of friction with the scale pan; the first letter, therefore will have an apparent weight greater than the second letter. To overcome this problem, the upper surface of the scale pan 64 is in a plane which passes beneath the pivot point, at bearing 67, for the yoke 66. Thus, in frictionally engaging the pan during forward sliding movement thereover, a letter exerts a forward force on, and in the plane of, the pan; this force acts as a torque in a counterclockwise direction about the bearings and counterbalances the effect of retardation of a letter passing across the scale pan. Since both the amount of retardation of the letter and the magnitude of the torque are dependent on the frictional engagement of the letter with the scale pan, it can be seen that a letter having a low coefficient of friction will be retarded less and also apply less torque than a letter which has a high coefficient of friction between the letter and the scale pan. Thus, with the plane of the scale pan passing under the pivot point for the yoke 66, increased measuring accuracy is obtained.

After the letters leave the scale pan 64, they slide along a bottom plate 90 (FIG. 1A) until they reach a roller 92 mounted on a shaft 94 which is rotatably mounted between the side plates 14 and 16. The roller 92 again gives the letters sufficient velocity to slide along a bottom plate 96 and through the gate mechanism generally indicated by the numeral 98. It is to be noted that the pan has a front edge 64b above the plate 90.

The gate mechanism 98 is controlled by the microswitch 78 and comprises a generally triangularly shaped gate 100 (FIG. 2B) mounted at the upper end of the vertical shaft 102 which is mounted for rotation within a bracket 104 fixed to the central plate 17. The lower end of the shaft 102 carries a laterally projecting arm (not shown) which is connected by a link 106 to the plunger 108 of a solenoid 110 also fastened to the bracket 104. A return spring 109 maintains the plungers 108 extended when the solenoid 110 is not energized. The normal position of the gate 100 is shown in full lines in FIG. 1B. When the gate is in this position, letters traveling from left to right, as viewed in FIG. 1B, will be deflected onto a take away conveyor 112 by a deflecting plate 114 which is mounted just forward of the gate 100. A second guide plate 116 is mounted adjacent the opposite side of the take away conveyor 112 so that the letters will be maintained in their upright position while traveling on the conveyor.

When the solenoid 110 is energized by closing of the microswitch 78, the gate 100 will be moved to the dashed line position illustrated in FIG. 1B, and letters striking the gate will be moved upwardly as viewed in FIG. 1B to the opposite side of the deflector plate 114. A second deflector plate 118 joins the side surface of the plate 114 and is curved to deflect letters on the upper side of the plate 114 as viewed in FIGURE 1B into a reject bin (not shown).

An important relationship exists between the gate 100 and the several elements with which it cooperates and with the letters traveling therethrough and is best illustrated in FIG. 4. It will be noted that the plate 96 on which the letters are traveling is notched at 97 to provide a recess therein within which the gate 100 is mounted. The gate has a rear end portion 103 which is beneath the lower edges of the side belts 40 and 42 and which projects laterally outwardly from the belts when the gate is in either of its set positions (FIG. 1B). Thus the lower forward corner 105 of the letter, which is beneath the lower edges of the side belts 40 and 42 and thus beneath the point of contact between the lower edge of a side belt and the upper edge of the gate 100, must strike a side surface of the gate and can not become jammed between a side belt and the rear edge of the gate. The gate also has an upper edge 101 which slopes forwardly and upwardly from said rear edge so that if a letter strikes said upper edge, it is deflected upwardly over the gate and does not jam between the gate and a side belt. If for any reason the gate 100 should change position while a letter is traveling through the gate zone the letter will be moved into contact with one or the other of the side belts. Since the side belts are moving in the same direction as the letter, the letter will be carried through the gate area by said belt.

The take away conveyor belt 112 is trained around a drive pulley 120 (FIGS. 1A and 2A) fixed to the rotating shaft 94. The opposite end of the conveyor belt 112 is trained around an idler pulley 122 (FIGS. 1B and 2B) which pulley is mounted on a shaft 124 carried by a swinging bracket 126 pivotally mounted on a shaft 128 extending between the side plates 14 and 16. Suitable springs 130 serve to swing the bracket 126 in a direction to maintain tension on the belt 112.

The drive mechanism for all of the various conveyors and operating mechanisms comprises a main motor 140 (FIG. 2A) bolted to the bottom plate 18. A drive belt 142 connects the pulley 144 of the motor 140 with a pulley 146 on the previously described shaft 60. A second drive belt 148 (FIG. 1A) connects two pulleys 150 and 152 respectively mounted on the shafts 26 and 60. Another belt 154 connects a pulley 156 on the shaft 60 with a pulley 158 on the shaft 94. Two flexible drive shafts 160 and 162 are connected to the opposite ends of the shaft 94 and are connected to the drive pulleys 44 and 48 for the vertical side belts 40 and 42, respectively.

In order to minimize or eliminate the aerodynamic forces upon the letter being weighed, there is provided adjacent the inlet to the side belts 40 and 42 an inverted U-shaped plenum chamber 170 (FIG. 1A). A fan or blower 172 is mounted on the upper end of the plenum chamber 170 and is adapted to maintain the air pressure therein above atmospheric pressure. Two air nozzles 174 and 176 are connected to the leg portions respectively of the plenum chamber 170 and extend forwardly and inwardly therefrom to the nip between the pulleys 46 and 50 for the side belts 40 and 42 respectively. Thus, it will be seen that air from the nozzles 174 and 176, which nozzles are equal in height to the width of the vertical belts 40 and 42, is blown between the side belts 40 and 42 and moves at substantially the same speed as the belts and thus in the same direction and speed as the letters being conveyed between the belts. The letters, therefore, are not subjected to aerodynamic forces normally caused by relative movement between the letters and the air since the air in the zone between the belts moves in the same direction as the letters and at the same speed as the letters.

The aerodynamic forces involved are exemplified by means of a letter having its upper front corner bent over. Such a bent corner presents a forwardly facing upwardly and rearwardly sloping plane surface. If the letter is traveling faster than the ambient air, the air impinging on this surface tends to deflect the letter downwardly resulting in an overweight deflection of the scale pan. When the ambient air is traveling at the same speed and direction as the letter there is no air stream impinging on this surface hence no deflection of the letter. It will be appreciated that if instead of the upper corner being bent, it is the lower corner which is bent, the aerodynamic force of the impinging air stream will tend to lift the letter. Of course the amount of force involved will vary depending on the manner of bending the corners and the amount of bending involved. However, regardless of the amount of force involved elimination thereof is accomplished by eliminating the impinging air stream.

Referring now to the wiring diagram illustrated in FIG. 5, the main drive motor 140 for the conveyors and the fan or blower 172 are connected directly across the 110 volt supply line. The 110 volt supply line is also connected to the primary of a transformer 180, the secondary of which is connected to a full wave rectifier 182 which applies 12 volts D.C. across the lines 184 and 186. The microswitch 78 has its contacts 188 connected in series with the coil 190 of a relay 79 which through its contacts 192 controls the flow of current to the gate operating solenoid 110. An anti-arcing circuit 194 is connected across the contact points of the microswitch 78, and a similar anti-arcing circuit 196 is connected across the contact point of the relay 79.

The relay 79 is of the type which will close in a maximum time of 0.005 second and is provided with a time delay on its release so that the contacts require from 0.067 to 0.086 second to open. Thus, when a letter which is too heavy deflects the scale pan and closes the microswitch 78, the relay closes practically immediately to move the gate 100 downwardly as viewed in FIG. 1B, to its reject position. Due to the time delay built into the relay, the letter, after leaving the scale pan, will have sufficient time to pass through the gate assembly 98 before the relay contacts open to permit the gate assembly to swing back to its normal position.

The important features which are incorporated in the present invention and which are defined in the appended claims are the provision of an air stream over the scale pan to eliminate aerodynamic forces on the letters, the locating of the plane of the scale pan with respect to its pivotal mounting so that frictional force between the letters and the scale pan create a torque which counterbalances the effect of retardation of the letters caused by the same frictional force, the draining of static electrical charges from the letters, and the provision of a jam proof gate structure for the segregating of overweight letters from a stream of letters.

By using the several relationships of elements described above, the mechanism of the present invention is capable of segregating letters weighing 1.025 ounces from letters weighing 1.000 ounce while the letters are traveling at a speed of approximately 110 inches per second.

Although a preferred embodiment of the present invention is described herein, it should be noted that various changes may be made therein without departing from the spirit of the invention or the scope of the appended claims.

The invention having thus been described, what is believed to be new and desired to be protected by Letters Patent is:

1. In an apparatus for handling a lightweight planar article, such as a letter or the like, having a surface area which normally subjects the article to aerodynamic forces when the article is in motion, means for conveying the article along a path at a predetermined velocity and for supporting the lower edge of the article so that its plane is disposed upright and longitudinally of the path while being conveyed, and means for moving air lengthwise of said path while being conveyed and at substantially said velocity so that there is substantially no relative movement between said article and its environmental air thereby to counteract the effect of aerodynamic forces on the article.

2. A method for neutralizing the effect of aerodynamic forces on a letter or like article to minimize inaccuracies in weighing comprising the steps of conveying the letter along a path at a predetermined velocity, weighing the letter, and moving air along said path at substantially the same velocity as said letter while said letter is being conveyed so that there is substantially no relative movement between said letter and its environmental air.

3. In an apparatus for neutralizing an electrostatic charge on a letter or like article as said letter is weighed, letter weighing means, means for moving a letter to and from said weighing means, said moving means including a metallic portion adapted to contact the letter before and during movement onto said weighing means, and electrically grounded means connected to said metallic portion for conducting electrostatic charges on said letter to ground.

4. In a high speed article weighing mechanism, means defining a straight path of travel for said articles having an input end, an input conveying means for delivering articles to said means, a scale pan forward of said input conveying means, means responsive to deflection of said scale pan for deflecting articles laterally of said path, and means adjacent the input end of said straight path defining means for directing a flow of air in the direction of movement of the articles at substantially the same speed as said articles.

5. In a high speed letter weighing mechanism, two movable spaced side belts defining a straight path of travel for said letters having an input end, an input conveyor for delivering letters between said side belts, a scale pan forward of said input conveyor, means responsive to deflection of said scale pan for deflecting letters laterally of said path, and means adjacent the input end of said path of travel for directing a flow of air between said side belts in the direction of movement of the letters therebetween at substantially the same speed as said letters.

6. In a high speed article weighing mechanism, two spaced metal side belts defining a straight path of travel for said articles, means electrically grounding said side belts, an input conveyor for delivering articles between said side belts, a scale pan forward of said input conveyor, and means responsive to deflection of said scale pan for deflecting articles laterally of said path.

7. In a high speed letter weighing mechanism, two spaced metal side belts defining a straight path of travel for said letters and having an input end, means electrically grounding said side belts, an input conveyor for delivering letters between said side belts, a scale pan forward of said input conveyor, means responsive to deflection of said scale pan for deflecting letters laterally of said path, and means adjacent the input end of said path of travel for directing a flow of air between said side belts in the direction of movement of the letters therebetween at substantially the same speed as said letters.

8. In a high speed article weighing mechanism, two movable spaced side belts defining a straight path of travel for said articles, said path of travel having an input end and a terminal end, an input conveyor for delivering letters between said side belts, a scale pan forward of said input conveyor, a gate mechanism forward of said scale mechanism and adjacent the terminal end of said path of travel, said gate mechanism being responsively operable to deflect articles onto a take away conveyor, means responsive to deflection of said scale pan for operating said gate mechanism to deflect articles laterally of said path, and means adjacent the input end of said side belts for directing a flow of air between said side belts in the direction of movement of the articles therebetween at substantially the same speed as said articles.

9. In a high speed article weighing mechanism, two spaced metal side belts defining the sides of a straight path of travel for said articles and having an input and a terminal end, an input bottom conveyor for delivering articles between said side belts, a scale pan forward of said input conveyor, a roller between said input conveyor and said scale pan to impart sufficient velocity to the articles to effect passage thereof across said scale pan, a gate mechanism forward of said scale pan and adjacent the terminal end of said path of travel, a second roller between said scale pan and said gate mechanism to give the articles sufficient velocity to move through said gate mechanism, said gate mechanism normally being maintained in position to deflect articles onto a take away conveyor, means responsive to deflection of said scale pan for shifting said gate from its normal position to a position blocking entrance of the articles to said take away conveyor, and means adjacent the input end of said path of travel for directing a flow of air between said side belts in the direction of movement of the articles therebetween at substantially the same velocity as said articles.

10. In an apparatus for accurately weighing a lightweight article while it is moving, said article having a lower edge and a lower front corner, means providing a substantially horizontal supporting surface, means for continuously moving the article in a predetermined forward direction along said surface with its lower edge contiguous to said surface and with its front corner moving along a predetermined path above said surface, a weighing pan having a portion positioned in said path for frictional engagement by said corner during said movement of an article whereby the article exerts a forwardly directed frictional force on the pan in the plane thereof, and means pivotally mounting said pan for downward movement relative to said surface when engaged by said article, said downward movement being proportional to the weight of the article, the plane of said pan projecting below the pivot axis of the pan whereby said forwardly directed frictional force imposes a torque on said pan in opposition to said downward movement of the pan.

11. In a high speed article weighing mechanism, an input conveyor for delivering articles to said mechanism, a scale pan mounted forward of said input conveyor, said scale pan being pivotally mounted and projecting forwardly from its mounting, the plane of the upper surface of said scale pan being below the level of the pivotal mounting, means for limiting upward movement of said scale pan, a microswitch mounted beneath said scale pan to be actuated thereby upon deflection of said scale pan, and a gate mechanism for deflecting overweight articles, said microswitch controlling the action of said gate mechanism.

12. In a high speed article weighing mechanism, an input conveyor for delivering articles to said mechanism, a scale pan mounted forward of said input conveyor, said scale pan being pivotally mounted and projecting forwardly from its mounting, the plane of the upper surface of said scale pan being slightly below the level of the pivotal mounting, means for limiting upward movement of said scale pan, a microswitch adjustably mounted beneath said scale pan to be actuated thereby upon deflection of said scale pan, a gate mechanism for deflecting overweight articles, said microswitch controlling the action of said gate mechanism, and means for directing a flow of air over said scale pan in the direction of movement of said articles at substantially the same velocity as said articles.

13. In a high speed letter weighing mechanism, two spaced side belts defining a straight path of travel for said letters, an input conveyor for delivering letters to said mechanism, a scale pan mounted forward of said input conveyor, said scale pan being pivotally mounted and projecting forwardly from its mounting, the plane of the upper surface of said scale pan being slightly below the level of the pivotal mounting, means for limiting upward movement of said scale pan, a microswitch adjustably mounted beneath said scale pan to be actuated thereby upon deflection of said scale pan, a gate mechanism for deflecting overweight letters, said microswitch controlling the action of said gate mechanism, and means for directing a flow of air between said side belts in the direction of movement of said letters at substantially the same velocity as said letters.

14. In a high speed article handling mechanism, spaced side means defining a path of travel, a triangular gate mounted adjacent one of its edges for pivotal movement about a vertical axis centered between said side means, means for shifting said gate about said axis from one position to another, the lower rear portion of said gate being below the level of the lower edges of said side means, and the top of said gate sloping forwardly and upwardly to a level above the lower edges of said side means, whereby when said gate is shifted into engagement with one of said side means the point of engagement will be between the top edge of said gate and the bottom edge of said side means with the rear edge of said gate projecting outwardly beyond the plane of said side means.

15. In a high speed letter handling mechanism, spaced side means defining a path of travel, a support plate on which the letters slide in upright position on their longitudinal edges, said plate having a notch defining a recess, a triangular gate having edges which include a forwardly and upwardly disposed leading edge which extends at its lower end into said recess, said gate being mounted for pivotal movement about a vertical axis centered between said side means, means for shifting said gate about said axis from one position to another.

16. In a high speed letter handling mechanism, spaced side means defining a path of travel, a support plate on which the letters are sliding in upright position on their longitudinal edges, said support plate having a notch defining a recess, a triangular gate having an inclined top edge, a lower edge interconnected to said top edge to define a lower rear portion and a rear edge, said gate being mounted for pivotal movement about a vertical axis centered between said side means, means for shifting said gate about said axis from one position to another, the lower rear portion of said gate being below the level of the lower edges of said side means, and the top edge of said gate sloping forwardly and upwardly to a level above the lower edges of said side means, whereby when said gate is shifted into engagement with one of said side means the point of engagement will be between the top edge of said gate and the bottom edge of said side means with the rear edge of said gate projecting outwardly beyond the plane of said side means.

17. In an apparatus for diverting a substantially planar article, such as a letter, having predetermined front and lower edges meeting in a front lower corner of the article as said article moves in a predetermined forward direction along a path, a support providing a surface extending along said path for slidable engagement by the lower edge of the article as the article moves along said path, an elongated side wall projecting upward from adjacent to said surface and extending longitudinally of said path for laterally supporting an article as it moves along said surface, said wall having a lower edge spaced above said surface and extending longitudinally of said path, a substantially triangular gate having lower and upright side edges interconnected by a top hypotenuse edge, and axis means positioned in said path in laterally spaced substantially parallel relation to said wall and being substantially normal to the plane of said surface, said upright edge of the gate being connected to said axis means with the lower edge of the gate being spaced below the lower edge of the wall, said gate projecting rearward from said axis means and being pivotable between a first position with said top edge engaging the lower edge of the wall and with the rearwardmost portion of the gate projecting on the opposite side of the wall from said axis means, and a second position with said gate spaced from said wall whereby said article is diverted on one side or the other of said axis means depending upon the position of said gate, and whereby the front lower corner of the article engages said gate below the point of contact of said top edge with said wall's lower edge so that said corner is precluded from wedging between the wall and the gate above said point of contact.

18. An apparatus for weighing letters comprising means for conveying and supporting a file of longitudinally spaced letters along a desired path, means for moving air in said path at substantially the same velocity at which said conveying means move the letters, and weighing means having a part thereof coplanar with the surface of the letter supporting reach and in longitudinal adjacency with the discharge of said conveying means for operating said weighing means as the letters pass thereover.

19. In an apparatus for weight-segregating letters, longitudinally spaced conveyors operable to move a file of letters placed thereon in spaced relation along a desired path, weighing means having a sensing element extending between and substantially coplanar with the letter supporting reach of said conveyors for detecting the weight of the letters as they move from one to the other conveyor, and means for moving air in such path at substantially the same velocity as letters.

20. In an apparatus for diverting a substantially planar article, such as a letter, having predetermined front and lower edges meeting in a front lower corner of the article, as said article moves in a predetermined forward direction along a path, a support providing a surface extending along said path for slidable engagement by the lower edge of the article as the article moves along said path, an elongated side wall projecting upward from adjacent to said surface and extending longitudinally of said path for laterally supporting an article as it moves along said surface, said wall having a lower edge spaced above said surface and extending longitudinally of said path, pivot means having the axis thereof positioned in said path in laterally spaced substantially parallel relation to said wall and being substantially normal to the plane of said surface, a gate connected to said pivot means and having a lower edge spaced below the lower edge of the wall and an upper edge, said gate projecting generally rearward from said pivot means, said upper edge extending upward and forward from said lower edge toward said pivot means, said gate being pivotable between a first position with said upper edge engaging the lower edge of the wall with the rearwardmost portion of the gate projecting on the opposite side of the wall from said pivot means, and a second position with said gate spaced from said wall whereby said article is diverted on one side or the other of said pivot means depending upon the position of said gate and whereby the front lower corner of the article engages said gate below the point of contact of said upper edge with said wall's lower edge so that said corner is precluded from wedging between the wall and the gate above the point of contact.

21. In a high speed article weighing mechanism, a support, a scale pan on which articles are weighed while moving over the pan, means mounting the pan in the support for pivotal movement about a predetermined axis with said pan projecting in a predetermined direction from said axis and with the upper surface of the pan lying in a plane which passes under said axis, means yieldably biasing said pan in a predetermined position for weighing purposes, and means for conveying an article over said pan in said predetermined direction so that the article engages said pan and exerts a weight force substantially normal to the pan and a frictional force substantially in said plane and in said predetermined direction.

References Cited by the Examiner

UNITED STATES PATENTS

| 756,600 | 4/1904 | Dodge. | |
| 1,556,057 | 10/1925 | Wheller. | |
| 2,127,511 | 8/1938 | Graf | 209—121 |
| 2,261,972 | 11/1941 | Matthews. | |
| 2,590,704 | 3/1952 | Howard | 209—121 |
| 2,633,972 | 4/1953 | Capstack. | |
| 2,805,898 | 9/1957 | Willis. | |
| 2,821,302 | 1/1958 | Fowler | 209—74 X |

FOREIGN PATENTS

| 952,565 | 12/1956 | Germany. |
| 468,692 | 7/1937 | Great Britain. |
| 675,556 | 7/1952 | Great Britain. |

ROBERT B. REEVES, *Primary Examiner.*

SAMUEL F. COLEMAN, *Examiner.*